US010382808B2

(12) United States Patent
Sirpal et al.

(10) Patent No.: US 10,382,808 B2
(45) Date of Patent: Aug. 13, 2019

(54) SYSTEM AND METHOD FOR DIGITAL TELEVISION OPERATION AND CONTROL

(71) Applicants: Jamdeo Canada Ltd., Oakville (CA); Hisense Electric Co., Ltd., Qingdao, Shandong (CN); Hisense USA CORP., Suwanee, GA (US); Hisense International Co., Ltd., Qingdao, P.R.C. (CN)

(72) Inventors: Sanjiv Sirpal, Oakville (CA); Mohammed Selim, Oakville (CA); Alexander DePaz, Burlington (CA); Salvador Soto, Toronto (CA)

(73) Assignee: Hisense Electric Co., Ltd., Qingdao, Shandong (CN)

(*) Notice: Subject to any disclaimer, the term of this patent is extended or adjusted under 35 U.S.C. 154(b) by 0 days.

(21) Appl. No.: 15/396,212

(22) Filed: Dec. 30, 2016

(65) Prior Publication Data

US 2018/0192114 A1 Jul. 5, 2018

(51) Int. Cl.
*H04N 21/422* (2011.01)
*H04N 21/431* (2011.01)
*H04N 21/482* (2011.01)
*G06F 3/048* (2013.01)
*G06F 3/0484* (2013.01)

(52) U.S. Cl.
CPC ....... *H04N 21/42224* (2013.01); *G06F 3/048* (2013.01); *G06F 3/0484* (2013.01); *H04N 21/4312* (2013.01); *H04N 21/4826* (2013.01)

(58) Field of Classification Search
CPC ......... H04N 21/42224; H04N 21/4312; H04N 21/4826
See application file for complete search history.

(56) References Cited

U.S. PATENT DOCUMENTS

| | | | | |
|---|---|---|---|---|
| 2012/0075352 A1* | 3/2012 | Mizutani | ............... | G06F 3/0488 345/684 |
| 2014/0300569 A1* | 10/2014 | Matsuki | .................. | G06F 3/041 345/173 |
| 2017/0094360 A1* | 3/2017 | Keighran | ........... | H04N 21/4318 |

* cited by examiner

*Primary Examiner* — Yassin Alata
(74) *Attorney, Agent, or Firm* — Gordon & Rees LLP

(57) ABSTRACT

The present disclosure relates to digital television processes and systems. In one embodiment, a method of controlling a display device includes presenting, by a display device, display content. The display device can receive a touch command indication, wherein the indication is associated with a remote control touch command exceeding a first threshold. The display device can also present a touch layer representation including content elements which are gradually presented based on the duration of the touch command received, determine that the touch command has exceeded a second threshold, and update presentation of the touch layer to display one or more graphical elements in response to the touch command exceeding the second threshold.

18 Claims, 13 Drawing Sheets

Title /13
Image with
Caption

Image with Caption Tile contains cover art as background and lines of text as overlay, which could be:

- Title
- Main info(Rating, downloads, Genre etc)
- Product main features
- Brief Intro Each stage stays for 3s.

365₂

Image

The Image Tile could show:

- Product image
- Promotion campaign poster
- Screenshot of the product content

Each stage stays for 3s.

365₃

Video

The Video Tile can be used to display short clips and ads for the promoted content.

The Video stays for its duration (recommended at 5s-20s)

365₄

Call to Action

Call to Action Tile includes an icon and a CTA title.

The CTA stage stays for 3s.

- 1005: presenting, by a display device, display content
- 1010: receiving, by the display device, a touch command indication, wherein the indication is associated with a remote control touch command exceeding a first threshold
- 1015: presenting, by the display device, a touch layer representation including content elements which are gradually presented based on the duration of the touch command received
- 1020: determining, by the display device, that the touch command has exceeded a second threshold
- 1025: updating, by the display device, presentation of the touch layer to display one or more graphical elements in response to the touch command exceeding the second threshold

US 10,382,808 B2

SYSTEM AND METHOD FOR DIGITAL TELEVISION OPERATION AND CONTROL

FIELD

The present disclosure relates to electronic devices and applications, and more particularly to display and content presentation devices.

BACKGROUND

Recent television devices are designed and developed to provide application and network services in addition to traditional television functions for display of broadcasted content. With the addition of functionalities and components on television devices, there exists a need for control interfaces for applications and television components. In particular, there exists a need for programs and configurations that allow for features of the applications to be presented, accessed and customized on a digital television. While execution of an application and application interfaces exist for digital televisions, there exists a need for improved control of television features. It can be difficult for device manufactures to provide menu based configurations that fit all devices across different product markets. Moreover, there exists a desire for interfaces to be customizable. Conventional on-screen interfaces do not allow for customization. Moreover, the conventional interfaces require complex menus with distracting elements and can require extraneous actions for use. There is a desire for modified configurations to optimize control and experience of digital televisions.

BRIEF SUMMARY OF THE EMBODIMENTS

Disclosed and claimed herein are methods, devices and systems for control of a digital television. One embodiment is directed to a method of controlling a display device includes presenting, by a display device, display content. The display device can receive a touch command indication, wherein the indication is associated with a remote control touch command exceeding a first threshold. The display device can also present a touch layer representation including content elements which are gradually presented based on the duration of the touch command received, determine that the touch command has exceeded a second threshold, and update presentation of the touch layer to display one or more graphical elements in response to the touch command exceeding the second threshold.

In one embodiment, the display device is a digital television and the display content includes video content presented by the digital television.

In one embodiment, display content further comprises a graphical element to signal touch command ability.

In one embodiment, the touch command indication signals operation of a capacitive touch sensor of a remote control device for the display device for a period of time within the range of 30-60 ms.

In one embodiment, the touch layer representation includes content elements that are gradually presented based on the duration of the touch command received.

In one embodiment, the second threshold is a time period within the range of 50-100 ms.

In one embodiment, updating, by the display device, includes presentation of the touch layer overlay which remains displayed in response to the touch command being less than a third threshold that is less than the first and second thresholds.

In one embodiment, updating, by the display device, includes presentation of the touch layer while the touch command is held.

In one embodiment, the touch layer includes graphical elements presented as tiles for content associated with the display content.

In one embodiment, the touch layer includes a content reel presentation that is a preview of another content title shown in a series of images generated media of the content title. The series of images are presented with one or more images associated with the content title. Elements of the content reel presentation may be independently selectable such that selecting one of the elements of the content reel presentation launches presentation of a partial or complete portion of the content title.

In one embodiment, presentation of the touch layer includes presentation independent of a main control interface of the display device.

Another embodiment is directed to a system for interaction with a display device. The system includes a remote control including a capacitive user interface. The remote control is configured to transmit commands based on operation of the capacitive user interface. The system includes a display device configured to present display content and receive a touch command indication from the remote control, the indication being associated with a remote control touch command exceeding a first threshold. The display device is also configured to present a touch layer representation including content elements which are gradually presented based on the duration of the touch command received, determine that the touch command has exceeded a second threshold, and update presentation of the touch layer to display one or more graphical elements in response to the capacitive touch command exceeding the second threshold.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein:

FIG. 12 depicts a graphical representation of exemplary content tiles of the control interface according to one or more embodiments; and FIG. 13 depicts a schematic overview of a method controlling a display device.

DETAILED DESCRIPTION OF THE EXEMPLARY EMBODIMENTS

Overview and Terminology

One aspect of the disclosure relates to providing a control interface for a digital television. In one embodiment, a system and framework are provided for presentation of a control interface including a display elements and interface components. According to another embodiment, processes and device configurations are presented for detection of a touch command indication and presentation of a touch layer representation. According to one aspect fo the disclosure, touch commands may be detected on a remote control and incorporated for user with a control interface that is generally operated from a distance. As such, a touch command indication does not relate to a touch command of the display device or digital television. In addition to detection of a touch command indication and comparison of the touch command duration to a threshold, the process involves configuration of the presentation output of the display device. As such, the control configuration can provide a representation of tactile control to a device that is operated from a distance.

Another aspect is directed to configuration of display elements of a control interface for presentation of content. Configurations discussed herein allow for graphical representation of content titles for selection of the content by way of a control interface.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Figure 1:
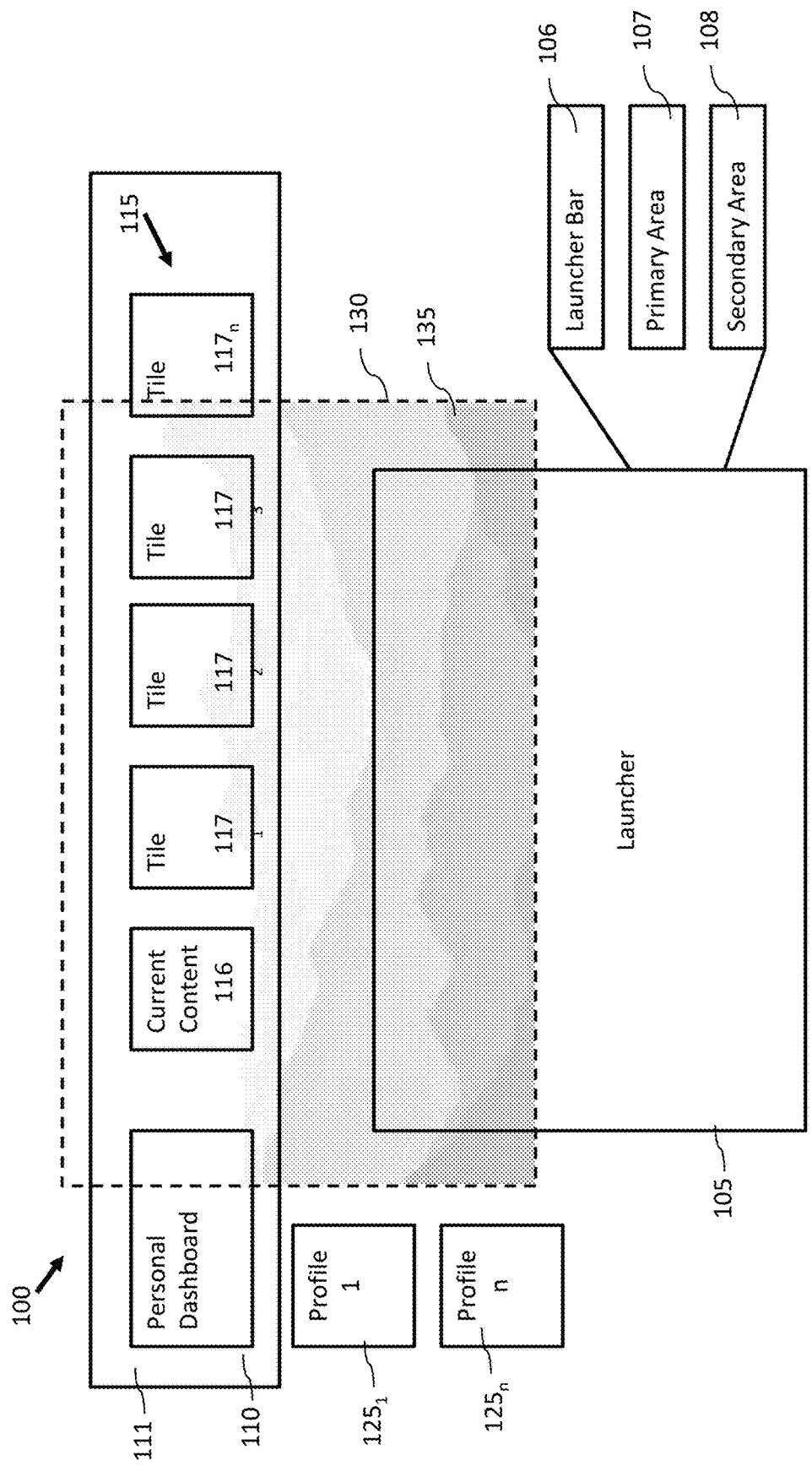
FIG. 1 depicts a graphical representation of a control interface of a display device according to one or more embodiments.

Referring now to the figures, FIG. 1 depicts a graphical representation of a control interface of a display device according to one or more embodiments. According to one embodiment, control interface 100 relates to a graphical user interface presented to control a display device, such as a digital television. According to one aspect of the disclosure, control interface 100 includes a plurality of components that each provide a plurality of functions and features for control and operation of a display device. In addition to providing separate components for particular interaction, control interface may also be configured to operate with a specific arrangement. According to one embodiment, presentation of each component of control interface 100 is presented based on a spatial arrangement model. According to one embodiment, the spatial arrangement model defines a relative position of components of control interface 100 to allow for directional navigation of the interface. By employing a spatial arrangement model, components of the control interface 100 allow for many features of the display device to be easily accessed and controlled. In addition to facilitating access, the spatial arrangement model provides a specific formatting to each view of control interface to emphasize elements for control.

According to one embodiment, components of control interface 100 include launcher component 105, dashboard component (e.g., personal dashboard) 110 and activity strip 115. According to another embodiment, a spatial arrangement model defines the location of each component of control interface 100 relative to a display screen. In an exemplary embodiment, launcher component 105 is oriented relative to a bottom portion of the display, dashboard component (e.g., personal dashboard) 110 is oriented relative to a left side of the display, and activity strip 115 is oriented relative a right side of the display. According to another embodiment, the display format of each component is defined by the spatial arrangement model such that each component may have an initial presentation characterized by a particular format, size, functionalities displayed, etc. Based on navigation commands relative to the control interface, the display device may update and rearrange the position and display format for each component of control interface 100.

Control interface 100 is shown in FIG. 1 relative to a display 130 and display content 135. According to one embodiment, the display format of control interface 100 can include presentation of some or all components of the control interface on display 130. Based on commands detected during presentation of the control interface 100, a display device may update the presentation format and elements of control interface 100 on display 130.

According to one embodiment, control interface 100 provides a mechanism for accessing multiple components of a display device. While the description of FIG. 1 discusses three components of control interface 100 (launcher component 105, dashboard component 110 and activity strip 115), it should be appreciated that additional components may be added to or included with control interface 100. As will be discussed herein, control interface 120 may be employed to control operation of digital television.

Activity bar includes plurality of tile elements 116 and $117_{1-n}$. According to one embodiment, presentation of control interface 100 may be presented as an overlay to content 135 presented on display 130. The display device may freeze or continue presenting the display output of content 135 in a tile element 116 in activity bar 115. In certain embodiments, navigation away from current content tile 116 will pause or stop playback. Current content tile 116 allows for selection of the previously displayed content to return to presentation of the display. Current content tile 116 is presented based on the content displayed by the display device prior to display of control interface 100. Tile elements $117_{1-n}$ relate to activity feed based on current content. In one embodiment, tile elements $117_{1-n}$ relate to a single type of content, such as broadcast TV shows related current content 116 and/or based on viewing habits of an active profile. According to another embodiment, tile elements $117_{1-n}$ may be a mix of content types, such as broadcast content, video on demand, applications, etc. In one embodiment, a display device may curate content and features to be included with activity bar as tile elements $117_{1-n}$ and present activity bar as a horizontal deck of elements in horizontal region 111. Horizontal region 111 allows for left and right directional commands to navigate to and within components of control interface 110.

Profiles $125_{1-n}$ relate to one user profiles stored by a display device for control interface 100. In one embodiment, profiles $125_{1-n}$ are utilized to determining display format of the personal dashboard component 110. According to another embodiment, one or more elements of launcher component 105 and activity strip 115 may be presented base on an active profile of profiles $125_{1-n}$. When a profile has not been selected, an active profile may be the last selected or utilized user profile.

According to another embodiment, components of control interface 100 may be selected, navigated and updated based on user interactions with a display device and one or more inputs from a remote control. According to one embodiment, elements of control interface 100 are presented by display device 130, such as digital television, as part of control interface 120.

Presentation of control interface 100 may be in response to a command from remote control, such as selection of a home or menu key. According to another embodiment, control interface 100 may be displayed shortly after a power on of display device 130. According to another embodiment control interface 100 may be presented following presentation of a wake animation and prior to display of a sleep or shutdown animation.

From control interface 100, several features and functions of a display device may be provided by ordered combinations of display device operation and graphical elements presented by the display device.

Launcher

According to one embodiment, launcher component 105 is configured to allow for a user to access content and control features of the display device. In one embodiment, launcher component includes a launcher bar 106, primary area 107 and secondary area 108. Launcher bar 106 may related to a plurality of tab elements arranged in a horizontal strip, wherein selection by moving a highlight element of the display device to a tab element will update the presentation elements of the launcher. By way of example, launcher bar 105 may include a tab for broadcast channels, video on demand and display device settings. Primary area 107 may include presentation of tile elements below the launcher bar 106. Tile elements of primary area 107 may be selected by the display device as the most relevant content of features associated with a selected tab element. Secondary area 108 may be presented below the primary area with additional tiles associated with content and/or display device function. Secondary area 108 may allow for additional selectable elements. According to one embodiment, the display format of launcher bar 106, primary area 107, and secondary area 108 may be based on the presentation status of the control interface. For example, launcher component may be presented initially with launcher bar 106, then commands to expand launcher component (e.g., a directional command) can result in display device updating the display output to include one or more tile elements of the primary area. Tile elements of the secondary area 108 may be presented based on additional navigation within the launcher component.

According to one embodiment, an initial format, such as a home screen presentation, of control interface 100 includes presentation of launcher bar, and a row of tile elements of the primary area. Based on a user input to select and/or navigate within launcher component 105, additional formats may be presented such as an increase in presentation footprint of the launcher to allow for secondary area 108 to include additional rows of tile elements. According to another embodiment, the primary area 107 and secondary area 108 of launcher component 105 may also include a first section for presentation of a most relevant tile element, and a second section for presentation of other tile elements along a horizontal display plane.

According to one embodiment, control interface 100 provides launcher component 105 as an overlay control interface to allow for presentation of content and control features based on selection of launcher tabs and navigation within the launcher component. In one embodiment, the configuration of launcher component 105 is a progression away from traditional desktop menus and allows for simple directional commands to access TV, network, applications, recommendations, personalized configurations, and recent content. According to another embodiment, launcher bar 106 of launcher component 105 includes a plurality of tab or tile elements, wherein each tab allows for a selection of a particular type of content, source of content, and/or control features of a display device. Based on the selection of a tab element of launch bar 106, launcher component may present multiple rows of content/element tiles and allows for scrolling to additional rows within a display window to provide and extended content region. In one embodiment, each row of content tiles may be navigated to based on vertical directional commands (e.g., up/down) and rows of content tiles may be navigated with horizontal directional commands (e.g., left/right). The presentation order of rows and even tiles in each row may be based on one or more of a selected user profile, content presented prior to display of control interface 100 and relevance determinations. In additional to content, such as video and programming information, tiles presented in launcher component 105 may relate to one or more of applications, settings, smart home applications, education/learning applications, gaming, etc.

Launcher Search

According to one embodiment, control interface 100 may include a search functionality component including a graphical interface for searching content titles, applications and elements of launcher component 105. In one embodiment, the search functionality may be presented as a drop down (e.g., down sliding transition) interface from an intermediary presentation format of control interface 100. According to another embodiment, the search functionality can interact with other devices (e.g., mobile devices) with a display device hosting a network interface for entry of search queries. Features of the search functionality can include one or more of a text entry box, alpha numeric display, recent search listing and suggested search results.

Personal Dashboard

According to one embodiment, control interface 100 includes dashboard component 110 to provide a user customizable control interface for a portion of the control features. In one embodiment, dashboard component 110 provides graphical elements for selecting and modifying display attributes and functionality of the dashboard. According to another embodiment, dashboard component can allow for a graphical selection of user profiles that can define features of control interface 100.

According to one embodiment, personal dashboard component 110 allows for presentation of a personalized control interface associated with a user profile. By way of example, display device is configured to allow a user to personalize the display format of the user interface to select display attributes such as a wallpaper, avatar, etc. In that fashion, dashboard component 110 allows for presentation of a personalized control interface. According to one embodiment, control interface 100 can allow for presentation of several user profiles $125_{1-n}$. Selection of the profile may be performed during navigation to personal dashboard component 110 within control interface 100. According to one embodiment, the initial display presentation format of personal dashboard component 110 relates to a tile element, such as a screen capture of the personal dashboard. When an intermediate display configuration of control interface 100 is provided, the same tile representing personal dashboard component 110 may be reformatted. According to one embodiment, personal dashboard component 110 may be displayed adjacent to activity bar 115 in a horizontal region 111 of the display.

In one embodiment, dashboard component 110 provides a display interface to include notifications and access to applications which may be run by a display device. According to another embodiment, dashboard component 110 allows for personalization such as one or more of wake/sleep animations, screensavers, audio themes, badges and gaming. Dashboard component 110 allows for a customizable interface within the overall control interface 100 of a display device.

Touch Interface

Presentation of elements within control interface can include one or more display formats and format changes. In certain embodiments, presentation of elements introduces similarities of touch commands to a display device operated from a distance without actual contact to the display. According to one embodiment, control interface 100 can update presentation of display elements such as tiles to gradually reveal content. According to one embodiment, control interface 100 can receive inputs based on a capacitive touch sensor with gradual display of elements, but also allowing for accidental touches. Capacitive interaction can provide a control feature with a level of touch control for a display device that is normally operated/viewed from a distance. Control interface 100 may be configured with an interaction to model tactile representation for interaction with elements based on a capacitive/interactive remote control. In one embodiment, interaction may include progressive disclosure of content, a multilayered preview into content and instant access to recommendation.

Contextual Touch

According to one embodiment, elements of control interface 100 can support presentation of tile elements as overlay to content without presentation of the full control interface. By way of example, a display device may be configured to recognize a category or genre of actively displayed content and present a display of similar programs to avoid the need to access a display menu and searching of content.

Instant Companion Application and Search

According to one embodiment, control interface 100 can allow for control of a display device by a mobile device and to allow for presentation of graphical display elements of control interface 100 to be displayed by a mobile device. In one embodiment, control interface 100 may host temporary access between a display device and another web enabled device. According to another embodiment, devices may be paired based on displayed elements that may be detected by the web enabled device. Thus, control interface 100 may be configured for pairing/connection with a user interface, such as a personalized user dashboard for display devices and search functions within the launcher control interface. According to certain embodiments, interaction of a mobile device with control 100 does not require a user to download a specific application to establishing the temporary network connection for interaction and control of a display device.

Smart Sense Recommendations

According to one embodiment, control interface 100 can utilize one or more processes for populating content elements within launcher component 105. According to one embodiment, control interface 100 may be presented based on processes for tracking and identifying content for recommendation within the launcher component. For example, content tiles may be arranged in groupings such that groupings with the highest contextual relevance priority are arranged towards the top of launcher component 105.

Conversense

According to one embodiment, control interface 100 and elements of control interface 100 can be utilized by a display device to present a display configured tailored to startup of the display device with information and display elements having high relevance. In one embodiment, elements of the startup display may be selected and presented based on a recognized time of day, personal settings and history.

Figure 2:
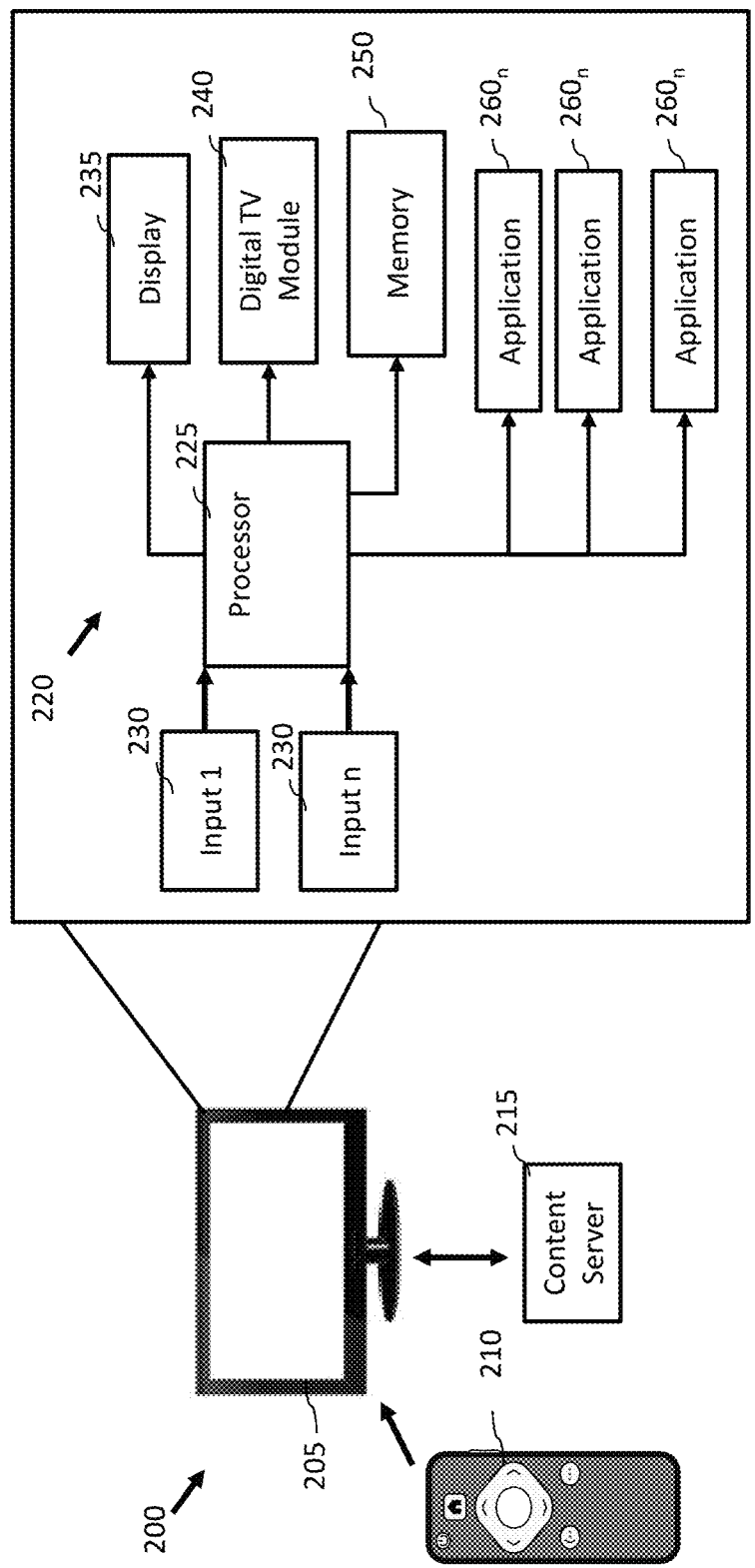
FIG. 2 depicts a simplified system diagram according to one or more embodiments.

FIG. 2 depicts a simplified system diagram according to one or more embodiments. System 200 includes display device 205 and remote control 210. Remote control 210 may be configured to provide commands for interaction with and control of display device 205 relative to a control interface (e.g., control interface 100) presented by display device 205. Content, applications and other network services may be provided to display device 205 by way of one or more content servers, such as content server 215.

Digital television 200 includes processor 225, inputs 230, display 235, digital TV module 240, memory 250, and applications $260_{1-n}$. It should be appreciated that digital television 205 may include one or more additional components not shown in FIG. 2. Digital television 205 is configured to present a control interface as described herein.

Inputs 230 relate to physical inputs for receiving video/image content and/or network data for presentation of content on display 235. Digital TV module 240 includes decoder/converter elements to receive information and content from inputs 230 which is then formatted and output to processor 225 for presentation on display 235. Memory 250 may include ROM and RAM memory for operation of digital television 205 and processor 225.

Processor 225, in addition to controlling operation of a digital television, is configured to control presentation and operation of a control interface. According to one embodiment, processor 225 is configured to detect commands for presentation of a control interface for the digital television, present the control interface including an expanded tab element and a plurality of tab elements. Processor 225 may also detect second or additional commands for the control interface to select one of the plurality of tab elements and update presentation of the control interface in response to the commands.

Exemplary Embodiments

Figure 3:
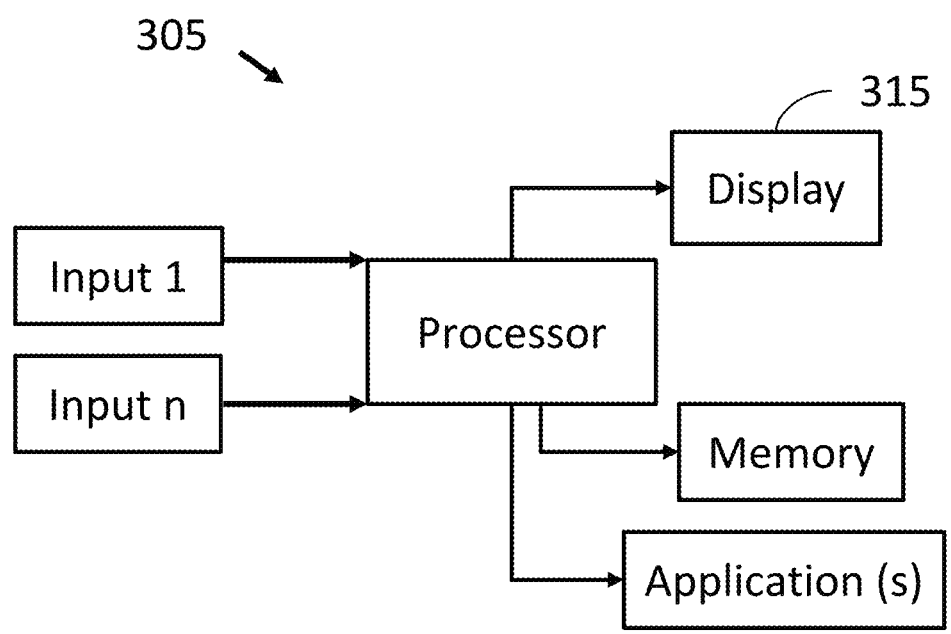
FIG. 3 depicts a simplified diagram of a digital television.

FIG. 3 depicts a simplified diagram of a digital television according to one or more embodiments. Digital television 305 includes processor, inputs, display 315, memory, and application(s). It should be appreciated that digital television 305 may include one or more additional components not shown in FIG. 3. Digital television 305 is configured to present a control interface 320 as described herein.

Inputs of television 305 relate to physical inputs for receiving video/image content and/or network data for presentation of content on display 315. Memory may include ROM and RAM memory for operation of digital television 305 and its processor. Processor of television 305, in addition to controlling operation, is configured to control presentation and operation of a control interface 320 and related touch layers. According to one embodiment, its processor is configured to detect commands for presentation of control interface 320, present the control interface 320 including an expanded tab element and a plurality of tab elements.

Figure 4:
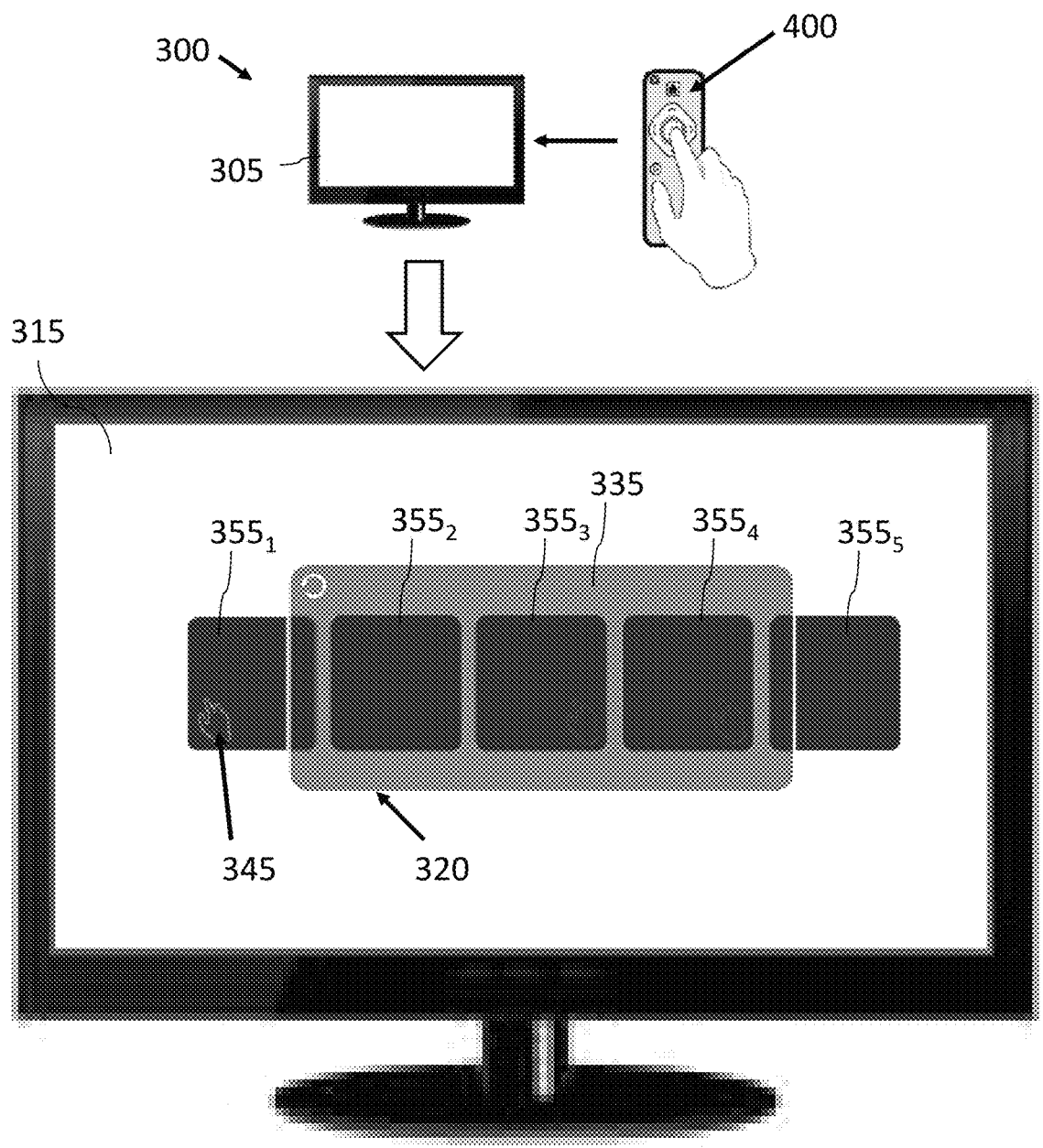
FIG. 4 depicts a graphical representation of a digital television control interface according to one or more embodiments.

FIG. 4 depicts a graphical representation of a system including a digital television configured to present a control interface according to one or more embodiments. System 300 of FIG. 4 depicts digital television 305 and remote control 400. According to one embodiment, digital television 305 includes display 315 configured to present control interface 320. As will be discussed herein, control interface 320 may be employed to control operation of digital television 305. According to another embodiment, control interface 320 may be selected, navigated and updated based on user interactions with digital television 305 and one or more inputs from remote control 400, including through one or more touch commands received by the control 400.

According to one embodiment, control interface 320 may include a plurality of tab or tile elements, shown as $355_{1-n}$ and $365_{1-n}$. Control interface 320 may be presented based on a predetermined user input received by remote control 400. The predetermined user input may include one or a combination of capacitive touch events defined by strength, duration, and/or location on control 400. As discussed more particularly below, one capacitive touch event may include a "light" touch event that launches control interface 320. A cursor 345 associated with the specific input and location on control 400 and/or location of cursor 345 may also be used to drag or move control interface 320. One of the plurality of tab elements may be presented with an extended (e.g., silo, expanded, highlighted, etc.) presentation format, while each of the other tab elements may be presented with a tab format. In addition, a highlight element 335 may be displayed within the extended presentation format, such that commands to move the highlight to a new or different tab element will modify the presentation format of the tab selected by the highlight and return the presentation format of the extended tab element to a tab configuration.

According to another embodiment, tab elements $355_{1-n}$ includes a plurality of elements each associated with content that are presented to display device 305. By allowing for selective input from control 400, multiple elements $355_{1-n}$ based on respective content may be previewed, presented, or otherwise observable on display device 305. In FIG. 4, each element $355_{1-n}$ can include one or more identifying characteristics, as discussed more particularly below. According to another embodiment, each tile element $355_{1-n}$ can be arranged in a row, grid, matrix, or the like.

Figure 5:
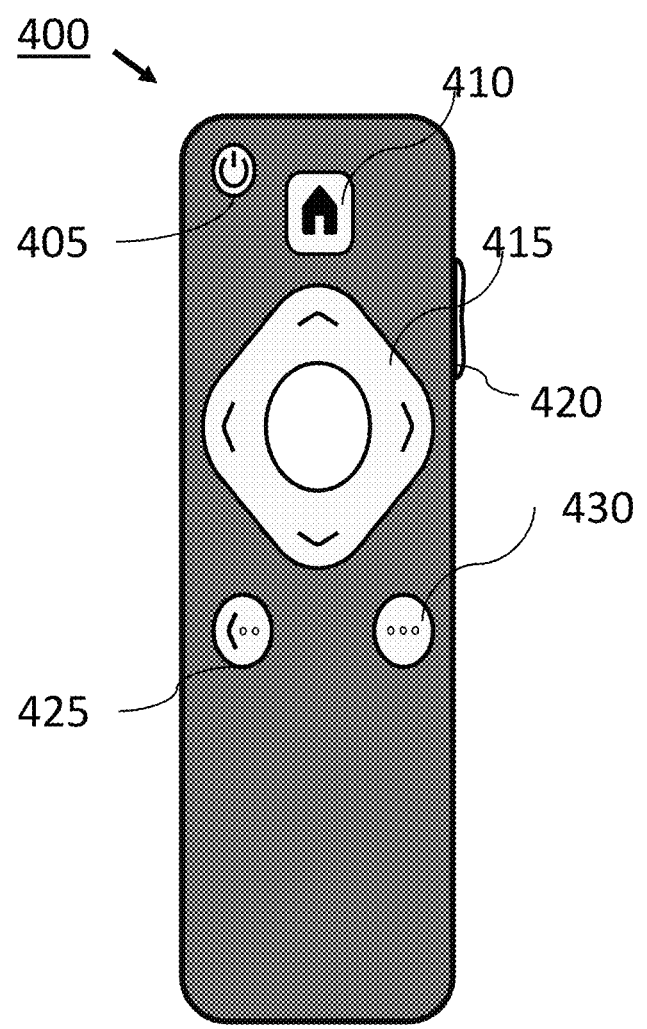
FIG. 5 depicts an example remote control according to one or more embodiments.

In FIG. 5, an exemplary remote control 400 to transmit commands to control interface 320 by selectively engaging one or more of the plurality of graphical elements that may be selected and interacted using touch commands. Touch events associated with control interface 320 is configured to allow for navigation, selection, and movement of highlight element 335, based on touch commands within control interface 320 and/or any elements $355_{1-n}$. According to one embodiment, a first touch event sensed by control 400 may cause control interface 320 to be initially presented.

In certain embodiments, remote control 400 includes power button 405 (to turn on and off a digital television), home 410, directional pad and select 415, back 425, menu 430, and volume up/volume down 420. According to one embodiment, remote control 400 may be employed to navigate and select elements of a control interface using directional pad and select 415. For example, select 415 may be operable to receive and distinguish between a plurality of different touch commands based on duration, force, whether touch is presently being sensed, or the like.

Turning back to FIG. 4, according to one embodiment, elements $355_{1-n}$ of control interface 320 are presented by digital television 305 as part of control interface 320. In addition, control interface 320 is presented to include a plurality of tab different elements $355_{1-n}$ configured in a horizontal bar configuration on a display of digital television 305. According to one embodiment, tab elements $355_{1-n}$ may include one or more elements associated with particular content. According to one embodiment, a portion of the tab elements $355_{1-3}$ is displayed on display 315, such that elements $355_{3-n}$ may be navigated, from control 400 via one or more touch commands sensed thereon, and presented on display 315. According to one embodiment, a touch event at control 400 can be directly linked to cursor 345 and presented on display 315 in order for a user to selectively drive element 335 and/or select one or more of elements $355_{1-n}$ for preview, play action, or the like. According to another embodiment, presentation of tab elements $355_{1-n}$ includes display of a symbol within each tab element and may also include a wallpaper or background image associated with content of the tab element.

Control interface 320 may include a navigation bar which is part of a hierarchy of control interface presentations. In one embodiment it is the starting point for accessing elements and menus of digital television 305, as discussed more particularly below. According to another embodiment, control interface 320 is associated with one or more setup procedures for digital television 305.

As will be discussed in more detail below, presentation of control interface 320 may be in response to a command from remote control 400, such as one or more touch events. According to another embodiment, control interface 320 may be displayed shortly after a power on of digital television 305. According to another embodiment control interface 320 may be presented following presentation of a wake animation and prior to display of a sleep or shutdown animation. In certain embodiments, presentation of control interface 320 includes a horizontal bar of tab elements defined by content, wherein one tab element can then updated to be displayed in an expanded tab view following a user input or selection of that tab element. Additional input commands may cause the presentation format of control interface 320 to be modified. The following figures include additional embodiments associated with controlling operation of digital television 305.

According to one embodiment, one or more touch events may be detected at select 415. For example, applying a capacitive input of a strength and/or duration may trigger control interface 320 and/or present related selectable elements. For example, in response to one or more touch commands sensed by remote control 400, a user interface layer of control interface 320 may be presented, a wait state of display 315 may be entered, one or more selections may be communicated from control 400 to interface 320 based on whether a launcher application or other user interface, separate from the initial interface 320, is present on display 315.

Figure 6:
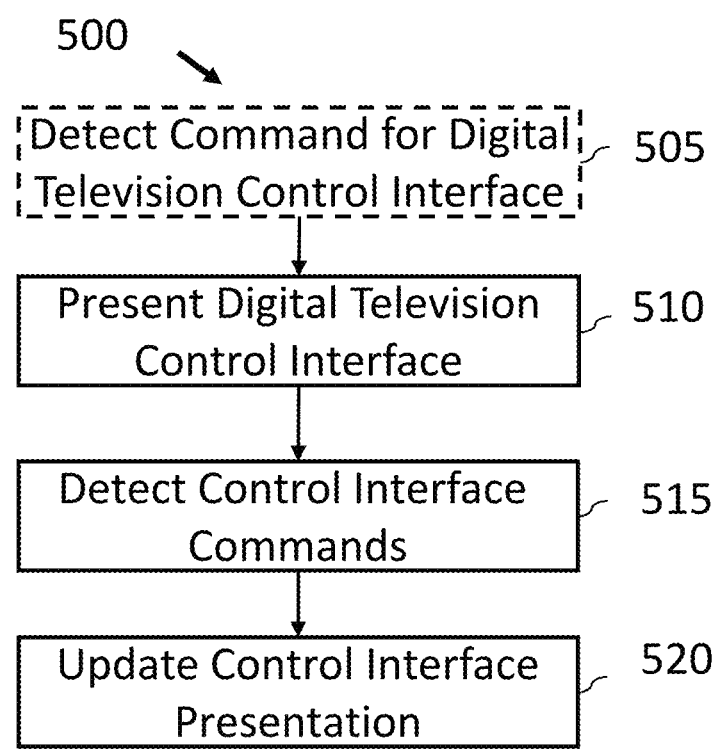
FIG. 6 depicts a graphical representation of digital television operation according to one or more embodiments.

FIG. 6 depicts an exemplary process for control of digital television 305 according to one or more embodiments.

Process 500 may be employed for control and/or presentation of a control interface (e.g., control interface 320). Process 500 discusses, in part, operations of commands within a control interface (e.g., control interface 320) and updating presentation of the control interface. According to another embodiment, control interface commands can produce presentation of other forms or configurations of control interfaces. By way of example, process 500 may be employed to presentation of a control interface of a digital television 305.

Process 500 may be initiated by presenting a control interface for a digital television at block 510. In one embodiment, the control interface is presented at block 510 to include an expanded tab element configured to provide a plurality of selectable elements associated with a category of the expanded tab element, and a plurality of tab elements configured in a horizontal bar configuration on a display of the digital television. According to another embodiment, control interface is presented at block 510 including one or more components, such as one or more of a launcher component, dashboard component and activity strip.

According to another embodiment, presenting the control interface at block 510 includes graphical elements determined by the digital television based on one or more of a setup procedure and use of the digital television. By way of example, tab elements may relate to live or fluid graphical elements that may be updated based on use of the digital television, selections, available content, personalization settings, etc. Thus, presentation of the control interface at a first point in time may include similar but different elements or configurations at a later point in time. By way of further example, in certain embodiments, one or both of the listing of tab elements and order of tab elements may remain the same, however presentation attributes of the tab elements and in particular graphical elements of the extended presentation format may be modified and updated by the digital television.

In certain embodiments, process 500 may optionally detect a command for a control interface at block 505 prior to presentation of the control interface at block 510. At block 515, the digital television detects a second command for the control interface to select one of the plurality of tab elements. In one embodiment, selection of a tab element at block 515 may include positioning a highlight element on a particular tab element. According to another embodiment, selection of a tab element at block 505 relates to a navigational command to select a tab element, portion of a tab element, or navigation command in general with respect to the control interface. One or more control interface commands may be detected at block 515. According to one embodiment, control interface commands at block 515 relate to input commands for a control interface of the digital television.

At block 520, the digital television updates presentation of the control interface in response to the commands detected at block 515 (e.g., second command). By way of example, the digital television can present a selected tab element with expanded configuration and provides a plurality of graphical elements. According to another embodiment, updating presentation of the control interface in response to the second command can include personalization of an avatar element of the control interface to include a user selected image and updating background image data for one or more tab elements.

Figure 7:
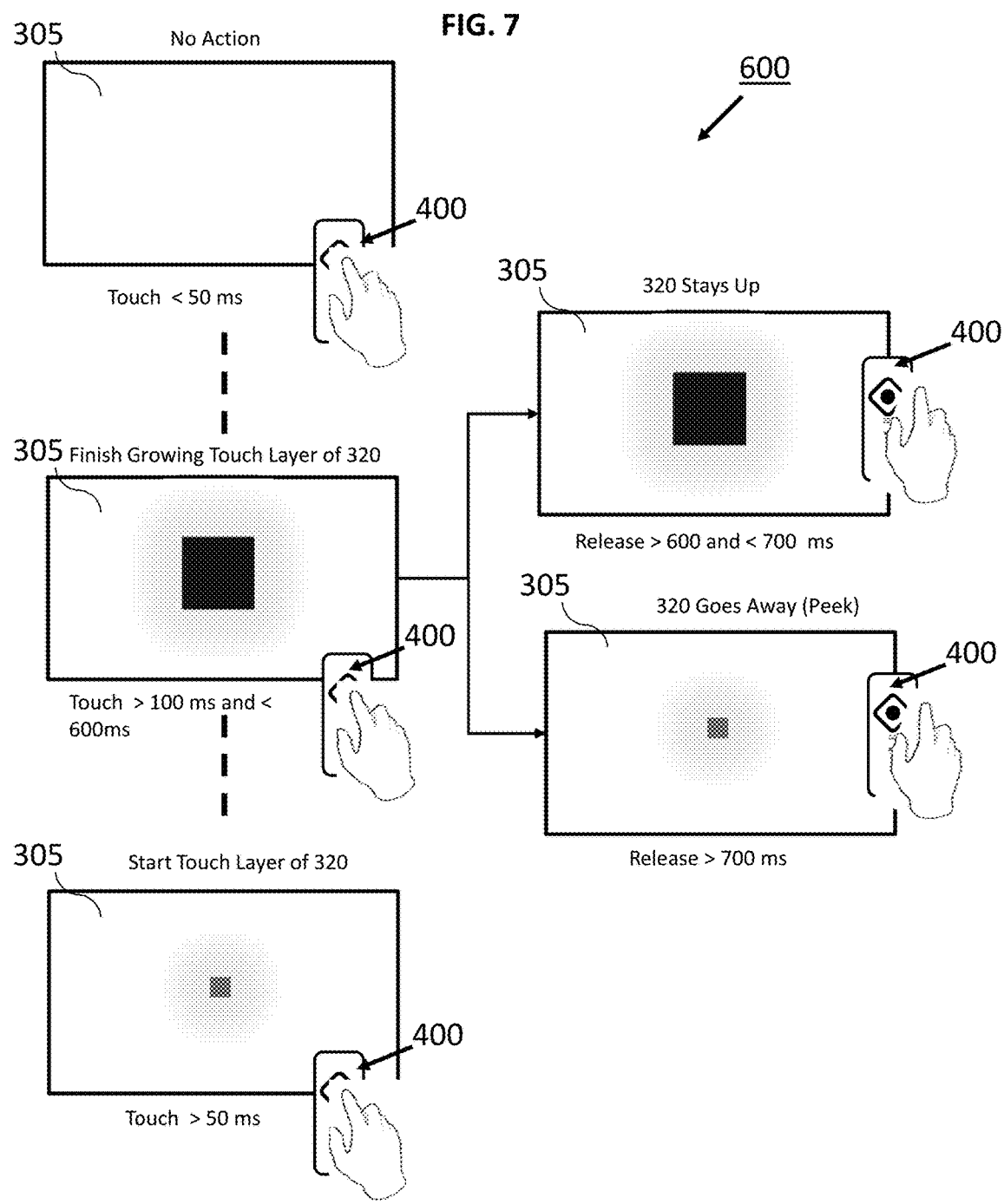
FIG. 7 depicts a graphical representation of a digital television control interface according to one or more embodiments.

FIG. 7 depicts a graphical representation of digital television operation 600 according to one or more embodiments. According to one embodiment of operation 600, television 305 may be initially presented with no action or content displayed thereon. A touch command of a first duration (e.g. approximately 50 ms or less) may not lead to action being controlled or effected on television 305 (e.g. presentation of a control interface or touch layer). In contrast, if the touch command indication signals operation of a capacitive touch sensor of control 400 for a second duration (e.g. ranging approximately between 100 ms and 600 ms or between 50-100 ms) can cause a first touch layer of interface 320 to be presented.

The touch layer representation can include content elements which are gradually presented based on the duration and/or strength of the touch command received. The duration, strength of other criteria can control the speed at which the touch layer is gradually presented. For example, if it is determined that the touch command has exceeded the second duration, presentation of the touch layer is updated to display one or more graphical elements in response to the touch command exceeding the second duration. The touch layer may also display content with one or more graphical elements to signal touch command ability, thereby indicating to the user that additional touch commands can be transmitted. Upon presentation of the first touch layer, a third command may be detected by control 400 by a release or sense of non-input for a duration of time (e.g. between 600 ms and 700 ms). Upon detection of the third command in operation 600, the first touch layer of interface 320 will remain present on television 305. In certain embodiments, detection of the third command can cause presentation of the touch layer overlay which remains displayed in response to the touch command being less than the duration of the duration of time that is less than the first and second durations. However, if the release or sense of non-input detected by the control exceeds the duration of time associated with the third command, then the user interface 320 may be caused to disappear or vanish from television 305. In certain embodiments, presentation of the touch layer caused by any of the first, second, or third commands can be caused while the touch command is held.

Figure 8:
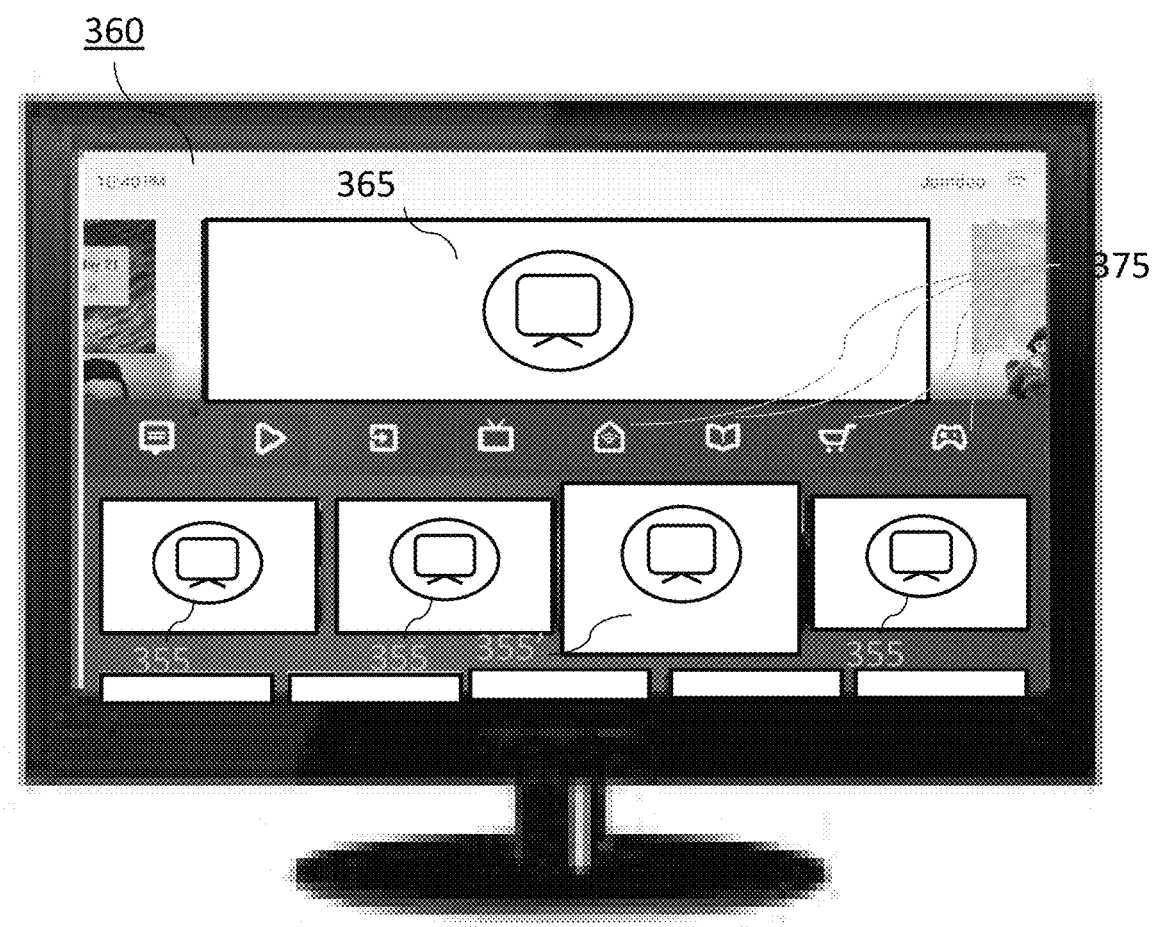
FIG. 8 depicts a graphical representation of digital television operation according to one or more embodiments.

Turning to FIG. 8, according to another embodiment, tab elements of one of the touch layers 360 of the control interface 320 may include different categories or types of content and control features to be accessed. For example, the touch layer 360 includes graphical elements presented as tiles for content associated with the display content. According to one embodiment, the control interface 320 includes presentation of touch layer 360 of tab elements $355_{1-n}$ configured for personalization, at least one tile element 365 (e.g. a content tile) for selecting content for presentation by the display device 305, a tile element 375 for settings, shopping, games, a tile for live (e.g., broadcast) content, and/or the like. It should be appreciated that other types of tiles 375 may be included as discussed herein. According to another embodiment, the presentation format for a touch layer 360 of control interface 320 may be based on based on content that is automatically generated based on one or more ranking criteria associated with content, a particular location, date, and/or a selected user profile generated by a setup process of the digital television 305. As such, preferences of tab elements 375 more frequently used may be more prominently displayed based on use of the digital television 305. Control interface 320 may also include one or more elements $355_{1-n}$ below or around elements 375, wherein respective elements $355_{1-n}$ may one or combination of previewable, presentable content associated with element 375. For example, if a user executes a touch command at control 400 corresponding with a selection of movie element 375, then a plurality of elements $355_{1-n}$ may be presented thereabout as to selectable content. Within the plurality of elements $355_{1-n}$ associated with selected element 375, one or more elements 355' may be enlarged for highlighted or enabling additional, gradual preview of the related content.

Exemplary control interface configurations of layer 360 can include content tile 365. Tile 365 may be enlarged and playing content associated with the tile, previewing content, or executing one or more combinations of audio-visual content associated with the content of tile 365. In this respect, elements 375 may be disposed or arranged in a horizontal bar underneath tile 365 and include one or more actuator or buttons associated with a particular action. For example, a "play" icon has been selected by control 400 thereby presenting underneath a plurality of content tiles 355 that can be selected or later investigated for execution by process 600. Each tile can be selected or defined based on tile 365, user information, or other related content information to generate content suggested or recommended for selection. In one embodiment, one of the configurations will be displayed when prompted; however, using the control interface 320, a setting or preference of format for the control interface may be stored by the digital television. According to another embodiment, tiles 355 may be presented by providing a scrollable list of tab elements. Elements $355_{1-n}$ may be scrollable based on movement or sensory of one or more touch commands and/or associated cursor 345 detected by control 400 in a vertical or horizontal direction and allow for selection of one or more tab elements from the list.

Figure 9:
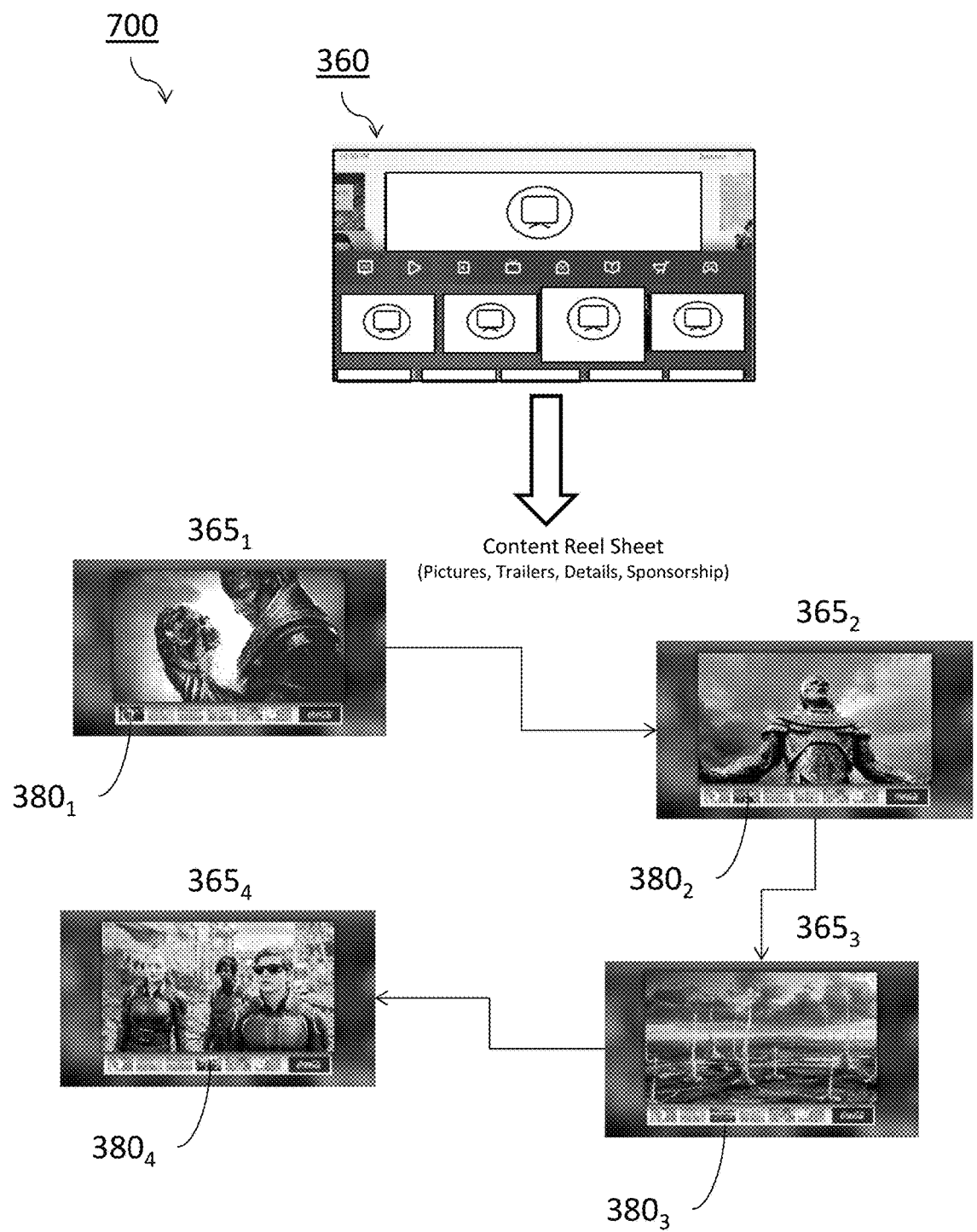
FIG. 9 depicts a graphical representation of digital television operation according to one or more embodiments.

Turning to FIG. 9, a schematic overview of operation 700 is shown for use in controlling the previously described touch enabled layer 360. As can be seen, operation 700 includes presentation of a content reel that is a preview of another content title(s) associated with tile 365 is shown in a series of images generated media of the content title. The series $365_n$ of images can be presented in a second touch layer separate from layer 360 and include one or more images associated with the content title. Elements $380_n$ of the content reel presentation $365_n$ may be independently selectable such that selecting one of the elements of the content reel presentation launches presentation of a partial or complete portion of the content title. In this respect, enhanced tile $365_n$ can be cycled through engaging visual content including images and short video clips associated with selectable elements $380_n$. Engaging and/or presentation of enhanced tile $365_n$ and selectable elements $380_n$ can be triggered by a touch event, a time delay, and/or detected movement associated with control 400. Further, lifting or releasing the touch event after presentation of enhanced tile $365_n$ and selectable elements $380_n$ can cause an auto-play operation of content associated with enhanced tile $365_n$ and selectable elements $380_n$, including one or more pictures, trailers, clips, content details, and/or sponsored content. For example, one or more of elements of series $365_n$ can be manually and/or automatically cycled through promotional content including audio and visual content.

Additionally, selecting an element $380_1$ can cause associated tile $365_1$ to be presented and engaged on display 305. In this regards, each element 380 presents a compact, preview of content associated with corresponding tile 365. In some embodiments, elements $380_n$ may be arranged in a predetermined series so that cycling through tiles $365_n$ according to the predetermined arranged series elements $380_n$ causes partial or complete portion of a content title to be presented. In this respect, elements $380_n$ can be presented in a scrollable navigation bar that provides feedback on the current view as well as manual navigation through views. Additionally, continuing to touch or hold the touch command after the layer 360 initially renders, then lifting or releasing the touch command, causes the tile 360 allowing users to preview or peek into the selected tile 365 as well as dismiss it using only one remote key interaction.

Figure 10:
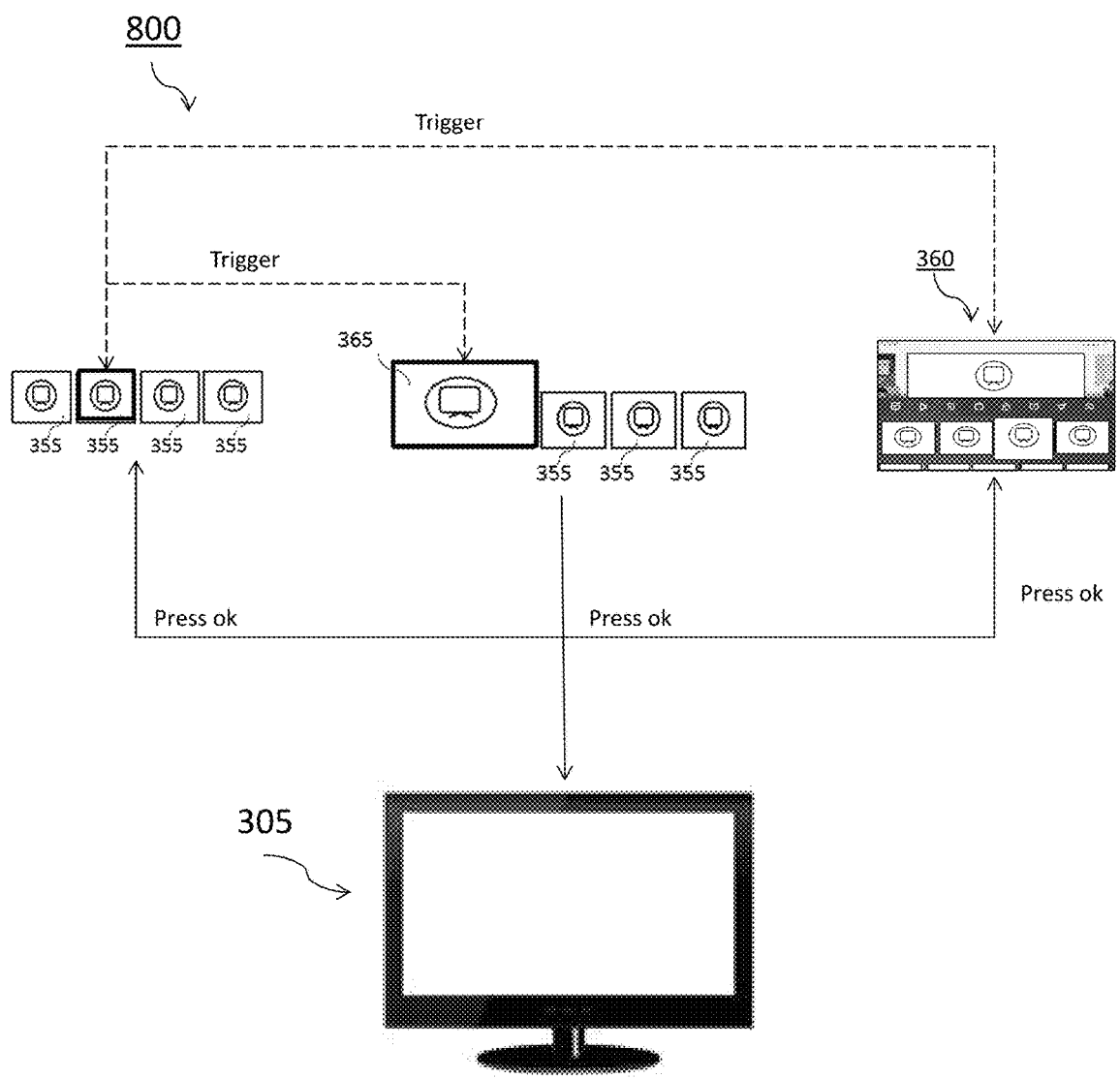
FIG. 10 depicts a graphical representation of digital television operation according to one or more embodiments.

Turning to FIG. 10, a schematic overview of operation 800 is shown for use in controlling the previously described touch enabled layer 360 using touch commands from control 400. In one embodiment, gradual progressive presentation of layer 360 and corresponding elements $365_n$, $380_n$ can be effected by one or more commands received by control 400 depending on characteristics of the event trigger associated with the command, including time delay, capacitive touch event (Touch), partial press (e.g. half press), location on control 400, or even combination or sequence of touch events. In operation 800, a user may select one or more of elements $355_{1-n}$ using a first trigger. The first trigger can cause a selected element $355_{1-n}$ to be enlarged or previewed in a changed state. The first trigger can cause presentation of a touch layer associated with enlarged tile 365 and/or corresponding elements $355_{1-n}$ to be presented on display 305 if a touch command of "ok" is transmitted from control 400. If "ok" is not transmitted, the presentation will revert back to the previous interface of the plurality of presented elements $355_{1-n}$. A user may also select one or more elements using a second trigger, the second trigger being different from the first trigger in or more trigger characteristics. The second trigger can cause presentation of layer 360, the user can either approve this presentation by selecting "ok" or instead, the user can reject the presentation of layer 360 such that the preceding interface of elements $355_{1-n}$ will be presented.

Figure 11:
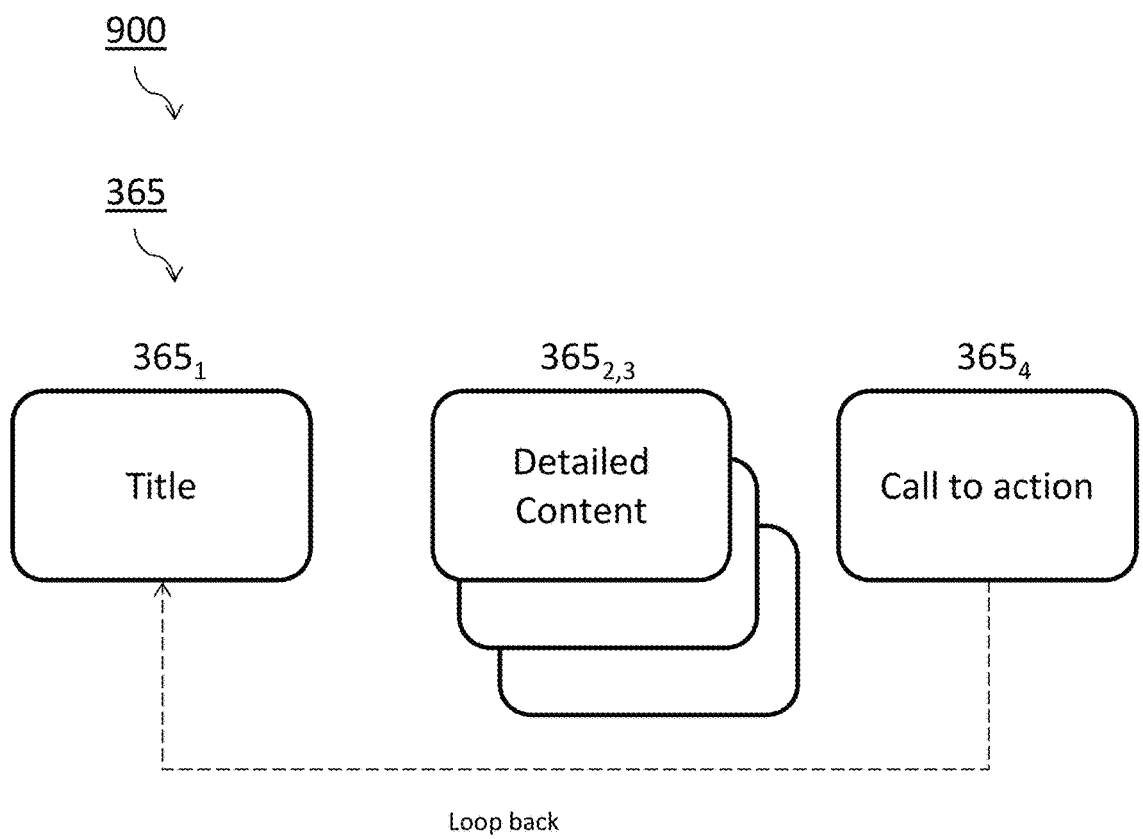
FIG. 11 depicts a graphical representation of digital television operation according to one or more embodiments.

Turning to FIG. 11, a schematic overview of operation 900 is shown. In operation 900, an element (e.g., element $355_{1-n}$) has been previously selected by using one or a combination of touch commands so that tile 365 is presented. A sequence of tiles $365_{1-n}$ are played, the tiles including audio visual elements beginning with identifying information (e.g., the title at tile $365_1$ s shown with one or more identifiers associated with content of the corresponding element 355 (e.g. content title). Thereafter, according to the sequence determined by the selected element 355, tiles $365_{2-n}$ are presented in a predetermined order such as year of releasing, rating, universal indicator of source of application, brief intro showing upfront to gauge a user's interests, and preview of the video content associated with the selected element 355. In certain embodiments, tiles $365_n$ can be presented as a content reel with a plurality of individual pages or frames (e.g. 2-5 pages), wherein each page can be a combination of content tile types (e.g. title, caption, image, video, call to action). The sequence of tiles $365_n$ may be operable to play once and return to the previous layer, loop a predetermined number of times, or continuously looping and repeat from the beginning at tile $365_1$. In certain embodiments, the user can select or pause on a content tile $365_n$ of interest at any time.

In certain embodiments, after conclusion of the sequence of tiles $365_n$, a call to action will be presented as to selecting the content of element 355 or returning to the previous touch layer of interface 320. It is to be understood that the element 355 is not only limited to audio visual content such as movies, clips, or episodes. Instead, elements 355 can include any number of other presentable audio and visual content including gaming, shopping, content that can be purchased, or even sponsored, branded content that is promoted.

Turning to FIG. 12, a graphical depiction of example tiles $365_{1-n}$ and corresponding identifying information are shown.

Turning to FIG. 13, a schematic overview of an operation 1000 is depicted according to this disclosure. In step 1005, display content is presented by a display device. In step 1010, the display device receives a touch command indication, wherein the indication is associated with a remote control touch command exceeding a first threshold. In step 1015, the display device presents a touch layer representation including content elements which are gradually presented based on the duration of the touch command received. In step 1020, the display device determines that the touch command has exceeded a second threshold. In step 1025, the display device updates the presentation of the touch layer to display one or more graphical elements in response to the touch command exceeding the second threshold.

While this disclosure has been particularly shown and described with references to exemplary embodiments thereof, it will be understood by those skilled in the art that various changes in form and details may be made therein without departing from the scope of the claimed embodiments.

What is claimed is:

1. A method of controlling a display device, the method comprising:
   presenting, by a display device, display content;
   receiving, by the display device, a touch command indication, wherein the indication is associated with a remote control touch command exceeding a first threshold;
   presenting, by the display device, a touch layer representation including content elements which are gradually presented while the touch command is held based on the duration of the touch command to gradually reveal the content elements of a control interface;
   determining, by the display device, that the touch command has exceeded a second threshold while the touch command is held and during presentation of the touch layer representation; and
   updating, by the display device, presentation of the touch layer to display a control interface including one or more graphical elements in response to the touch command exceeding the second threshold while the touch command is held, the control interface including selectable tiles of recommended content associated with the display content presented by the display device,
   wherein the touch layer representation and control interface provide a progressive disclosure of content and a multilayered preview into recommended content.

2. The method of claim 1, wherein display device is a digital television and wherein the display content comprises video content presented by the digital television.

3. The method of claim 1, wherein display content further comprises a graphical element to signal touch command ability.

4. The method of claim 1, wherein the touch command indication signals operation of a capacitive touch sensor of a remote control device for the display device for a period of time within the range of 30-60 ms.

5. The method of claim 1, wherein the second threshold is a time period within the range of 50-100 ms.

6. The method of claim 1, wherein updating, by the display device, further comprises presentation of the touch layer overlay which remains displayed in response to the touch command being less than a third threshold that is less than the first and second thresholds.

7. The method of claim 1, wherein updating, by the display device, further comprises presentation of the touch layer while the touch command is held.

8. The method of claim 1, wherein detection of release of the touch command results in the control interface disappearing from the display device.

9. The method of claim 1, wherein the control interface comprises a content reel presentation that is a preview of another content title shown in a series of images generated media of the content title, the series of images presented with one or more images associated with the content title, wherein elements of the content reel presentation are independently selectable, the method further comprising: selecting one of the elements of the content reel presentation launches presentation of a partial or complete portion of the content title.

10. The method of claim 1, wherein presentation of the touch layer comprises presentation independent of a main control interface of the display device.

11. A system for interaction with a display device, the system comprising:
   a remote control including a capacitive user interface, the remote control configured to transmit commands based on operation of the capacitive user interface; and
   a display device configured to
      present display content;
      receive a touch command indication from the remote control, wherein the indication is associated with a remote control touch command exceeding a first threshold;
      present a touch layer representation including content elements which are gradually presented while the touch command is held based on the duration of the touch command received to gradually reveal the content elements of a control interface;
      determine that the touch command has exceeded a second threshold while the touch command is held and during presentation of the touch layer representation; and
      update presentation of the touch layer to display a control interface including one or more graphical elements in response to the capacitive touch command exceeding the second threshold while the touch command is held, the control interface including selectable tiles of recommended content associated with the display content presented by the display device,
      wherein the touch layer representation and control interface provide a progressive disclosure of content and a multilayered preview into recommended content.

12. The system of claim 11, wherein display device is a digital television and wherein the display content includes video content presented by the digital television.

13. The system of claim 11, wherein display content further comprises a graphical element to signal touch command ability.

14. The system of claim 11, wherein the touch command indication signals operation of a capacitive touch sensor of a remote control device for the display device for a period of time within the range of 30-60 ms.

15. The system of claim 11, wherein the second threshold is a time period within the range of 50-100 ms.

16. The system of claim 11, wherein the display device is further configured to update presentation of the touch layer overlay which remains displayed in response to the touch command being less than a third threshold that is less than the first and second thresholds.

17. The system of claim 11, wherein the display device is further configured to update presentation of the touch layer while the touch command is held.

18. The system of claim 11, wherein the control interface comprises a content reel presentation that is a preview of another content title shown in a series of images generated media of the content title, the series of images presented with one or more images associated with the content title, wherein elements of the content reel presentation are independently selectable, the display device further configured to select one of the elements of the content reel presentation launches presentation of a partial or complete portion of the content title.

* * * * *